(12) United States Patent
Xie et al.

(10) Patent No.: US 11,128,894 B2
(45) Date of Patent: Sep. 21, 2021

(54) METHOD AND MOBILE TERMINAL FOR PROCESSING DATA

(71) Applicant: BEIJING DAJIA INTERNET INFORMATION TECHNOLOGY CO., LTD., Beijing (CN)

(72) Inventors: Wannan Xie, Beijing (CN); Wei Fan, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 17/039,485

(22) Filed: Sep. 30, 2020

(65) Prior Publication Data
US 2021/0099733 A1 Apr. 1, 2021

(30) Foreign Application Priority Data
Sep. 30, 2019 (CN) .......................... 201910944055.0

(51) Int. Cl.
*H04N 21/2187* (2011.01)
*H04N 21/242* (2011.01)
*H04N 21/43* (2011.01)
*H04N 21/435* (2011.01)
*H04N 21/8547* (2011.01)

(52) U.S. Cl.
CPC ....... *H04N 21/2187* (2013.01); *H04N 21/242* (2013.01); *H04N 21/4307* (2013.01); *H04N 21/4356* (2013.01); *H04N 21/8547* (2013.01)

(58) Field of Classification Search
CPC ............. H04N 21/2187; H04N 21/242; H04N 21/4307; H04N 21/8547
See application file for complete search history.

(56) References Cited

U.S. PATENT DOCUMENTS

| | | | |
|---|---|---|---|
| 10,474,422 B1* | 11/2019 | Venti | H04L 67/02 |
| 2016/0277802 A1* | 9/2016 | Bernstein | H04N 21/431 |
| 2018/0234738 A1* | 8/2018 | Sarkar | H04N 21/2743 |
| 2020/0068262 A1* | 2/2020 | Saldana | H04N 21/4753 |
| 2021/0001236 A1* | 1/2021 | Srinivasan | A63F 13/87 |
| 2021/0136456 A1* | 5/2021 | Srinivasan | H04N 21/25875 |

* cited by examiner

*Primary Examiner* — Oschta I Montoya
(74) *Attorney, Agent, or Firm* — Knobbe Martens Olson & Bear LLP

(57) ABSTRACT

A method and mobile terminal for processing data are disclosed. The method can include displaying a live streaming page, the live streaming page including a file sharing interface for guiding an anchor to select a file for sharing during live streaming; displaying a file list in the case that the file sharing interface is triggered; acquiring a target file selected from the file list; generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal.

13 Claims, 8 Drawing Sheets

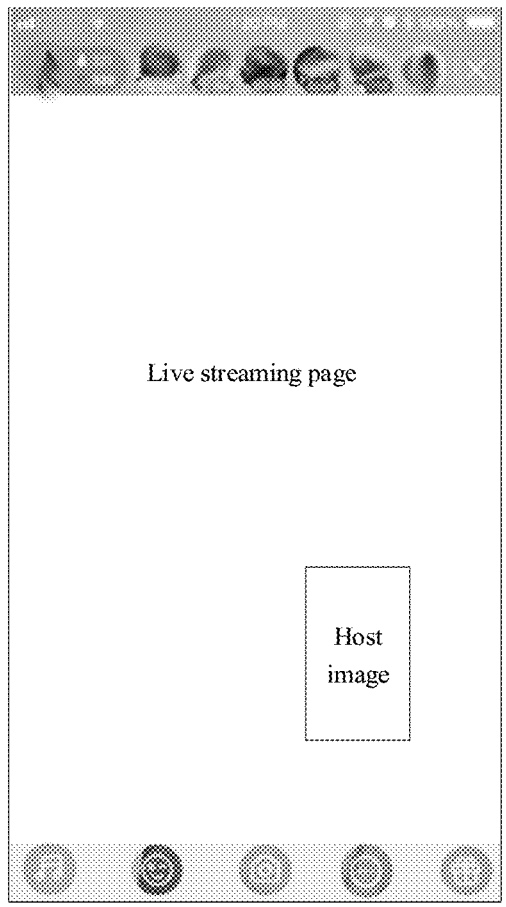

FIG. 7

Initiating a request to download first live streaming data and second live streaming data of a current live streaming room from a server, the first live streaming data and the second live streaming data carrying time stamp information respectively — S81

Aligning the first live streaming data and the second live streaming data according to the time stamp information respectively carried by the first live streaming data and the second live streaming data, and playing the aligned first live streaming data and second live streaming data — S82

FIG. 8

METHOD AND MOBILE TERMINAL FOR PROCESSING DATA

CROSS-REFERENCE TO RELATED APPLICATIONS

The present application claims the benefit of priority to Chinese Patent Application No. 201910944055.0 entitled "METHOD, APPARATUS AND SYSTEM FOR PROCESSING DATA, AND MOBILE TERMINAL AND STORAGE MEDIUM THEREOF" and filed on Sep. 30, 2019, the disclosure of which is incorporated herein by reference in its entirety.

TECHNICAL FIELD

The present disclosure relates to the field of Internet technologies and, particularly, relates to a method for processing data and a mobile terminal thereof.

BACKGROUND

With the continuous maturity of streaming media technology and the continuous improvement of the network environment, the application of live streaming is becoming more and more extensive. Compared with ordinary video on demand, live streaming has stronger interactivity. A more common form of live streaming is that a host broadcasts to the audience in his/her live streaming room.

In examples of the live streaming technologies, during the video live streaming process, the host terminal uploads the collected live video to the live server in real time, and the audience terminal obtains the live video from the live server, and the live video is played on the display interface of the audience terminal. It can be seen that the content of the live streaming depends on the content collected by the camera in real time, and the live content is relatively monotonous.

SUMMARY

The present disclosure provides a method for processing data and a mobile terminal thereof. The technical solutions of the present disclosure are as follows.

In one aspect, embodiments of the present disclosure provide a method for processing data, applicable to a first mobile terminal of an anchor. The method includes:

displaying a live streaming page, the live streaming page including a file sharing interface for guiding the anchor to select a file for sharing during live streaming;

displaying a file list in the case that the file sharing interface is triggered;

acquiring a target file selected from the file list;

generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal.

In another aspect, embodiments of the present disclosure provide a method for processing data, applicable to a second mobile terminal of an audience. The method includes:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming;

aligning the first live streaming data and the second live streaming data according to the time stamp information respectively carried by the first live streaming data and the second live streaming data, and playing the aligned first live streaming data and second live streaming data.

In still another aspect, embodiments of the present disclosure provide a mobile terminal. The terminal includes:

a processor; and a memory for storing at least one instruction executable by the processor, wherein the processor is configured to execute the at least one instruction to perform the steps of:

displaying a live streaming page, the live streaming page including a file sharing interface for guiding the anchor to select a file for sharing during live streaming;

displaying a file list in the case that the file sharing interface is triggered;

acquiring a target file selected from the file list;

generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal.

In yet still another aspect, embodiments of the present disclosure provide a mobile terminal. The terminal includes:

a processor; and a memory for storing at least one instruction executable by the processor, wherein the processor is configured to execute the at least one instruction to perform the steps of:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming;

aligning the first live streaming data and the second live streaming data according to the time stamp information respectively carried by the first live streaming data and the second live streaming data, and playing the aligned first live streaming data and second live streaming data.

In yet still another aspect, embodiments of the present disclosure provide a storage medium storing at least one instruction therein. The at least one instruction, when executed by a processor of a mobile terminal, enables the mobile terminal to perform the steps of:

displaying a live streaming page, the live streaming page including a file sharing interface for guiding the anchor to select a file for sharing during live streaming;

displaying a file list in the case that the file sharing interface is triggered;

acquiring a target file selected from the file list;

generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal.

In yet still another aspect, embodiments of the present disclosure provide a storage medium storing at least one instruction therein. The at least one instruction, when executed by a processor of a mobile terminal, enables the mobile terminal to perform the steps of:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming;

aligning the first live streaming data and the second live streaming data according to the time stamp information respectively carried by the first live streaming data and the second live streaming data, and playing the aligned first live streaming data and second live streaming data.

In yet still another aspect, embodiments of the present disclosure provide a computer program product including at least one executable program code. The at least one executable program code, when run by a processor of a mobile terminal, enables the mobile terminal to perform the steps of:

displaying a live streaming page, the live streaming page including a file sharing interface for guiding the anchor to select a file for sharing during live streaming;

displaying a file list in the case that the file sharing interface is triggered;

acquiring a target file selected from the file list;

generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal.

In yet still another aspect, embodiments of the present disclosure provide a computer program product including at least one executable program code. The at least one executable program code, when run by a processor of a mobile terminal, enables the mobile terminal to perform the steps of:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming;

aligning the first live streaming data and the second live streaming data according to the time stamp information respectively carried by the first live streaming data and the second live streaming data, and playing the aligned first live streaming data and second live streaming data.

BRIEF DESCRIPTION OF DRAWINGS

The accompanying drawings herein, which are incorporated in and constitute part of the description, illustrate embodiments consistent with the present disclosure, serve to explain the principles of the present disclosure together with the description, and do not constitute an undue limitation to the present disclosure.

FIG. 7 is a schematic diagram of a live streaming page that displays a target file and first live streaming data simultaneously in accordance with an embodiment of the present disclosure;

FIG. 8 is a flowchart of another method for processing data in accordance with an embodiment of the present disclosure;

DESCRIPTION OF EMBODIMENTS

For better understanding of the technical solutions of the present disclosure by persons of ordinary skill in the art, the technical solutions in the embodiments of the present disclosure are described hereinafter clearly and completely with reference to the accompanying drawings.

It should be noted that the terms "first", "second", and the like in the description, claims and drawings of the present disclosure are used to distinguish similar objects, and need not be used to describe a specific order or sequence. It should be understood that data used in this way is interchangeable under appropriate circumstances such that the embodiments of the present disclosure described herein can be implemented in an order other than those illustrated or described herein. Implementations described in the following example embodiments do not represent all embodiments consistent with the present disclosure, but are merely examples of devices and methods consistent with some aspects of the present disclosure as detailed in the appended claims.

User information involved in the present disclosure may be information authorized by a user or fully authorized by all parties.

In some embodiments, A and/or B means A and B, A, and B.

Figure 1:
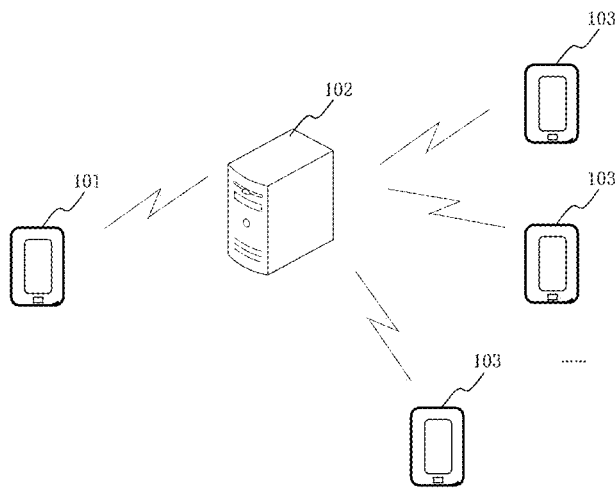
FIG. 1 is a schematic diagram of an implementation environment of methods for processing data in accordance with an embodiment of the present disclosure.

FIG. 1 is a schematic diagram of an implementation environment of methods for processing data in accordance with an embodiment of the present disclosure.

Referring to FIG. 1, the implementation environment includes a host terminal 101 used by an anchor, a live streaming server 102, and an audience terminal 103 used by an audience. In the present embodiment, the host terminal 101 and the audience terminal 103 include but are not limited to mobile terminals and fixed terminals. As an example, the mobile terminals include but are not limited to a smart phone, a tablet computer, a laptop, an e-reader, a Moving Picture Experts Group Audio Layer III (MP3) player, a Moving Picture Experts Picture Experts Group Audio Layer IV (MP4) player, etc., and the fixed terminals include but are not limited to a desktop computer, which are not specifically limited in the embodiments of the present disclosure.

In some embodiments, FIG. 1 only takes that the host terminal 101 and the audience terminal 103 are both smart phones as an example for explanation. The live streaming server 102 is configured to provide background services for the host terminal 101 and the audience terminal 103. The live streaming server 102 may be an independent server or a server cluster composed of multiple servers, which is not specifically limited in the embodiments of the present disclosure.

In addition, the host terminal 101 and the audience terminal 103 are usually equipped with application clients supporting the live streaming function to bring convenience for the anchor to enter a live streaming room for live streaming and for the audiences to enter the live streaming room to watch the live streaming. In the live streaming room, usually one anchor and multiple audiences are configured, i.e., the number of the host terminal 101 is one, and the number of the audience terminals 103 is more than one.

Figure 2:
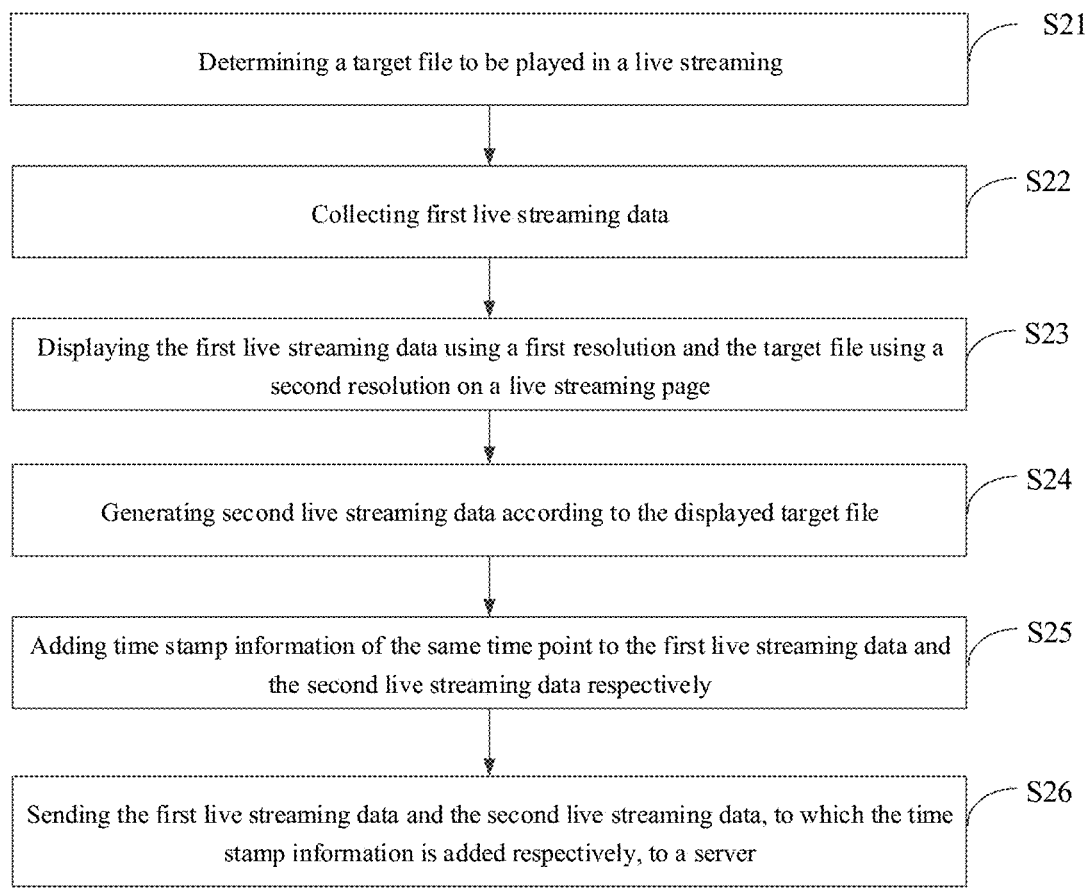
FIG. 2 is a flowchart of a method for processing data in accordance with an embodiment of the present disclosure.

FIG. 2 is a flowchart of a method for processing data in accordance with an embodiment of the present disclosure. In the present embodiment, the method is applicable to a first mobile terminal. In some embodiments, the method is applicable to a host client mounted on a first mobile terminal, and includes the following steps.

In S21, a target file to be played in a live streaming is determined.

In some embodiments, a file sharing interface is displayed on a live streaming page of the host client. The file sharing interface is for guiding the anchor to select a file for sharing during the live streaming. The selected file is a file on the first mobile terminal.

In some embodiments, S21 includes S211 to S213.

In S211, a live streaming page including the file sharing interface is displayed.

Figure 3:
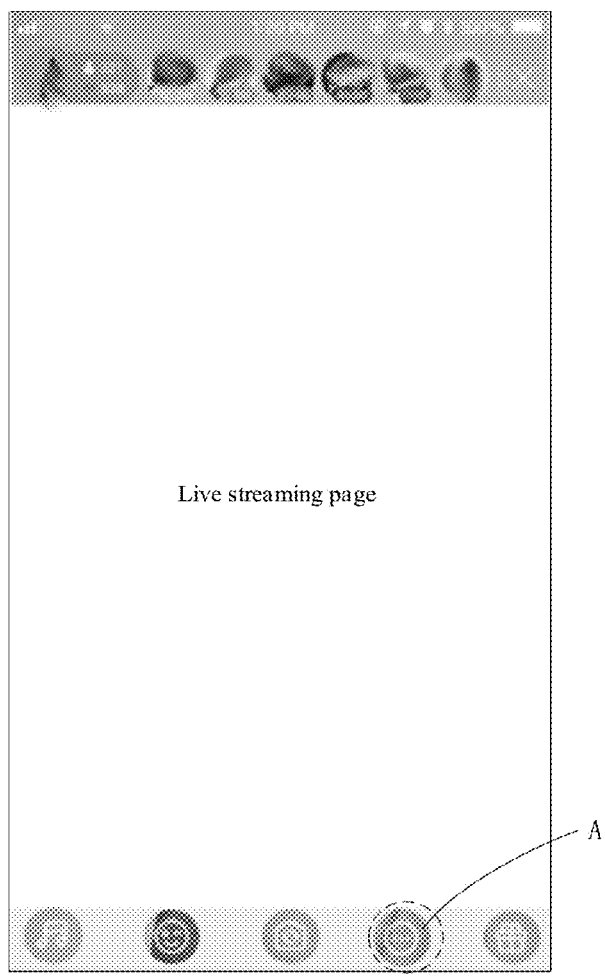
FIG. 3 is a schematic diagram of a live streaming page including more options in accordance with an embodiment of the present disclosure.

In this step, the live streaming page includes the file sharing interface when the anchor performs the live streaming by the first mobile terminal. For example, as shown in the schematic diagram of the live streaming page in FIGS. 3 to 4, when triggering a "more" function option in a portion A on the live streaming page in FIG. 3, the anchor enters a function option page shown in FIG. 4. A "file sharing" function in a portion B on the function option page is the file sharing interface.

In S212, a file list of the first mobile terminal is acquired and displayed in the case that the file sharing interface is triggered.

In this step, after the anchor triggers the file sharing interface on the live streaming page, the first mobile terminal calls a file acquiring interface to acquire all files of this terminal, forms the file list by all the acquired files and displays the file list on the live streaming page.

Figure 4:
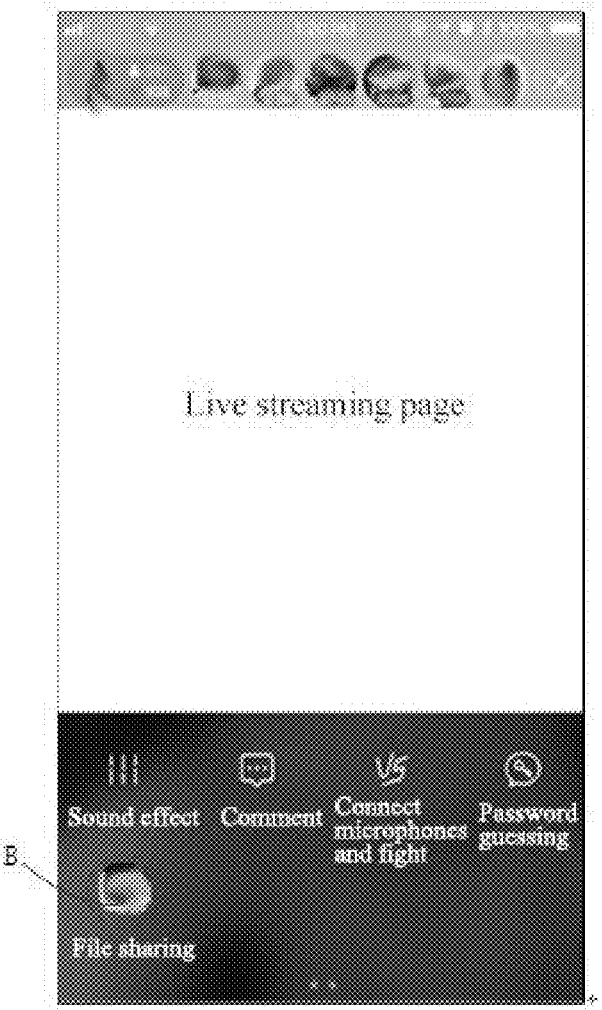
FIG. 4 is a schematic diagram of a live streaming page including a file sharing interface in accordance with an embodiment of the present disclosure.
Figure 5:
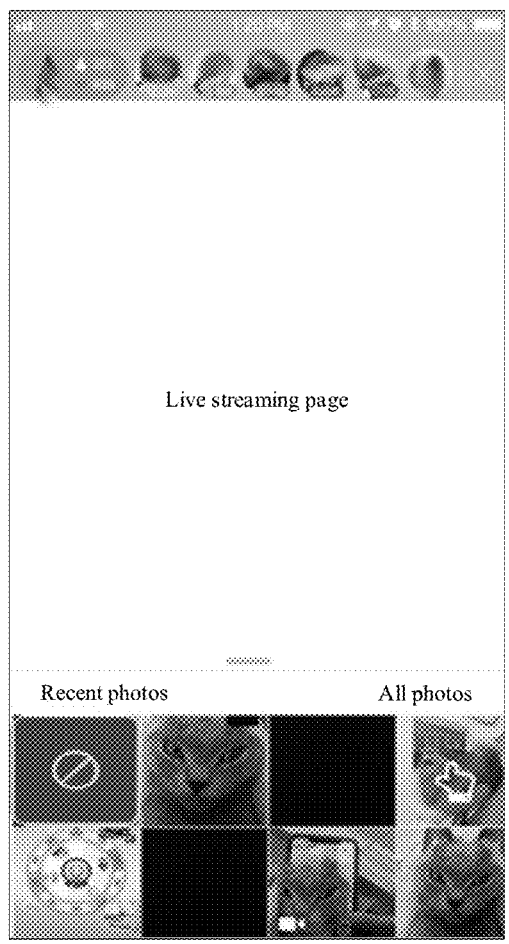
FIG. 5 is a schematic diagram of a live streaming page including a gallery selection list in accordance with an embodiment of the present disclosure.
Figure 6:
FIG. 6 is a schematic diagram of a live streaming page including a photo list in accordance with an embodiment of the present disclosure.

For example, when the anchor clicks the file sharing interface in FIG. 4, all file types of this terminal pop up, such as "gallery", "audio", "document" and "installation package". Assuming that the anchor selects a "gallery" file, a gallery selection list shown in FIG. 5 is entered and includes such options as "recent photos" and "all photos". In some embodiments, the anchor selects images or videos that need to be shared from a "recent photo list". In the case that there are no images or videos that the anchor wants to share in the "recent photo list", the user taps the "all photos" option, enters the "all photo list" shown in FIG. 6, and selects the images or videos that he/she wants to share.

In S213, the target file selected from the file list is acquired.

In this step, the selected file is taken as the target file after it is detected that the anchor selects a file in the file list.

In some embodiments, the target file includes a multimedia file or a non-multimedia file. The multimedia file includes image data, audio data, video data or the like. The non-multimedia file includes other files than the multimedia file, such as Word, PPT, Excel and other files, so that live streaming scenarios may be expanded to more fields, such as education, training, speech making, or the like.

In S22, first live streaming data is collected.

In some embodiments, the first live streaming data includes first image data collected by a camera of the first mobile terminal and/or first audio data collected by a microphone of the first mobile terminal.

In S23, first live streaming data is displayed on the live streaming page with a first resolution, and the target file is displayed on the live streaming page with a second resolution.

In some embodiments, the first mobile terminal calls a view control in a user interface (UI) application programming interface (API) provided by an operating system, and displays the first live streaming data and the target on the host client. In some embodiments, the first live streaming data is displayed in the first view control with a first resolution, and the target file is displayed in the second view control with a second resolution. Contents displayed in the first view control and the second view control are switched according to the user's switch operation.

In some embodiments, the first resolution and the second resolution are issued by a live streaming server to the host client, and the first resolution and the second resolution stored in the live streaming server are pre-configured by developers or operation and maintenance personnel.

In some embodiments, the first resolution is a resolution of a small window on a current live streaming page, the second resolution is a full-screen resolution required by the current live streaming, and the small window is a suspended window of which the size is smaller than a full-screen size of the first mobile terminal.

In some embodiments, the host may drag his/her own image to a suitable position. That is, the suspended window is moved and displayed according to a drag trajectory, wherein the drag trajectory is generated by dragging the suspended window displaying the first live streaming data.

For example, as shown in the schematic diagram of the live streaming page in FIG. 7, after the anchor selects the target file, a collection resolution of the host client is adjusted to the size of the small window, i.e., the currently collected live streaming image (i.e., the first live streaming data) is reduced to be displayed in the small window at the lower right corner. The screen is full of the image of the target file for display. For example, in the case that the target file is a picture, the picture is scaled down at the same proportion to the second resolution required for the live streaming by such scaling algorithms as libyuv. Libyuv is a library of Google's open source for implementing conversion, rotation and scaling between various YUV and RGB. For example, in the case that the target file is a video, it is rendered by Open Graphics Library (OpenGL), and a video frame in the video is reduced by a graphics processing unit (GPU) in a rendering pipeline to the second resolution required for the live streaming.

In some embodiments, the anchor may also drag the small window to a suitable position or stretch the size of the small window.

In S24, second live streaming data is generated according to the displayed target file.

In some embodiments, the second live streaming data includes second image data and/or second audio data.

In some embodiments, in the case that the target file is pure image data, the pure image data is taken as the second image data. Further, the YUV ("Y" represents luminance and luma, and "U" and "V" are chrominance and chroma) data obtained after decoding the image data are taken as the second image data. Since the target file is the pure image data free from the audio data, the second image data is taken as the second live streaming data.

In other embodiments, in the case that the target file is pure audio data, the pure audio data is taken as second audio data. Further, pulse code modulation (PCM) data obtained after decoding the audio data is taken as the second audio data. Since the target file is the pure audio data free from the image data, the second audio data is taken as the second live streaming data.

In some other embodiments, in the case that the target file is video data, second image data and second audio data are obtained after decoding the video data and are taken as the second live streaming data. Further, the video data is decoded, the YUV data obtained by decoding is taken as the second image data, and the PCM data obtained by decoding is taken as the second audio data.

In some other embodiments, in the case that the target file is a non-multimedia file, a screenshot is performed on the non-multimedia file to obtain the second image data. Since the target file is non-multimedia data, there is no audio data, i.e., the second image data obtained by the screenshot is taken as the second live streaming data. For non-multimedia files, during display, the first mobile terminal calls the API of file preview provided by the operating system to display the non-multimedia files on a view, and then changes the content of the view by graphics contexts into a bitmap image to obtain the second image data.

In S25, time stamp information indicating the same time point is added to the first live streaming data and the second live streaming data respectively. The time stamp information is intended to align the first live streaming data and the second live streaming data before playing the first live streaming data and the second live streaming data In the present embodiment, the host client pushes out the first live streaming data and the second live streaming data in two live streams to reduce the processing flow of the host client.

In order to ensure that the first live streaming data and the second live streaming data are played synchronously on the audience client, a time interval at which the time stamp information is added is set in the present embodiment, and at each fixed time interval, the time stamp information indicating the current time point is added to the first live streaming data and the second live streaming data corresponding to the current time point.

In some embodiments, the time stamp information is inserted into the live streaming data by the following means: Fill Element extension of advanced audio coding (AAC); flash video (FLV, in the format of stream media) Metadata (file element information); or H264's private NAL unit (NAL unit, which defines packet-based and bitstream-system-based basic formats) or the like.

In some embodiments, the time stamp information is a service time stamp. The embodiments of the present disclosure do not limit the specific form of the time stamp information as long as the time stamp information in the first live streaming data and the second live streaming data of the same time point indicates the same. For example, the time stamp information is a 64-bit character string, it indicates the time information (e.g., 20190709 10:00) of the current time point; or, the time stamp information is also expressed as millisecond description of the current time point.

In S26, the first live streaming data and the second live streaming data to which the time stamp information is added are respectively sent to the server.

That is, the first live streaming data carrying the time stamp information and the second live streaming data carrying the time stamp information are sent to the server.

After the time stamp information is added to the first live streaming data and the second live streaming data respectively, the first live streaming data and the second live streaming data are respectively sent to the server. In some embodiments, the first live streaming data and the second live streaming data are respectively sent to an edge server by a live streaming server for storage, an IP address of one of the edge servers storing the first live streaming data is selected, a download address of the first live streaming data is generated according to the IP address and sent to the second mobile terminal corresponding to a second user, an IP address of one of the edge servers storing the second live streaming data is selected, and a download address of the second live streaming data is generated according to the IP address and sent to the second mobile terminal corresponding to the second user. The second user is an audience.

After receiving the download addresses of the first live streaming data and the second live streaming data, the second mobile terminal requests to download the first live streaming data and the second live streaming data from the corresponding edge servers respectively, and locally plays the first live streaming data and the second live streaming data after aligning them.

In some embodiments, in order to reduce the time difference between time at which the second mobile terminal downloads the first live streaming data and time at which the second mobile terminal downloads the second live streaming data, the first live streaming data and the second live streaming data are stored in the same edge server, and an IP address of the edge server is returned to the second mobile terminal, such that the second mobile terminal downloads the first live streaming data and the second live streaming data from the same edge server, avoiding a download time delay caused by a network bandwidth difference between the different edge servers.

In some embodiments, a frame rate in the live streaming is determined in the following way: in the case that the target file is a non-video file, the first live streaming data and the second live streaming data are sent according to a first frame rate; and in the case that the target file is a video file, the first live streaming data and the second live streaming data are sent according to a second frame rate. The second frame rate is the frame rate of the decoded video file.

For example, in the case that the target file is a picture, the first live streaming data and the second live streaming data are periodically sent at the predetermined frame rate. In the case that the anchor selects one picture, the second live streaming data sent every time is the same picture. In the case that the anchor selects multiple pictures, the second live streaming data sent every time is the multiple pictures selected in turn. In the case that the target file is a video file, the first live streaming data and the second live streaming data are sent according to the frame rate decoded by the video file.

In another embodiment, the execution order of the above S23 and S24 may be interchanged. That is, the first mobile terminal generates the second live streaming data according to the displayed target file first, then displays the first live streaming data on the live streaming page with the first resolution, and displays the second live streaming data on the live streaming page with the second resolution. That is, referring to the above embodiment, the first mobile terminal performs the following steps.

In step a, a live streaming page including a file sharing interface for guiding the anchor to select a file for sharing during live streaming is displayed.

In step b, a file list is displayed in the case that the file sharing interface is triggered, and a target file selected from the file list is acquired.

In step c, second live streaming data is generated based on the target file.

In step d, first live streaming data and the second live streaming data are displayed on the live streaming page, and the first live streaming data is collected by a camera of the first mobile terminal.

In step e, the first live streaming data and the second live streaming data are synchronized to a second mobile terminal which is a terminal of the audiences.

FIG. 8 is a flowchart of a method for processing data in accordance with an embodiment of the present disclosure. The method is applicable to a second mobile terminal, and further applicable to an audience client installed on the second mobile terminal. The method includes the following steps.

In S81, a request is initiated from a server to download first live streaming data and second live streaming data of a current live streaming room. Both of the first live streaming data and the second live streaming data carry time stamp information.

In some embodiments, the server is an edge server. When pushed out in the live streaming room, at least two live streaming data are distributed to the same or different edge servers by a live streaming server for storage, and the live streaming server may also return a download address composed of an IP address of the edge server and memory addresses of the live streaming data to an audience client.

After acquiring the download address, the audience client requests to download the corresponding live streaming data from the corresponding edge server according to the download address.

In some embodiments, in order to avoid a big download time difference between the at least two live streaming data due to a bandwidth difference between the different edge servers, the at least two live streaming data are stored in the same edge server. That is, the at least two live streaming data acquired by the audience client corresponds to the same download address.

In some embodiments, the at least two live streaming data at least includes the first live streaming data and the second live streaming data. The first live streaming data is a host image collected by a camera of a host client, and the second live streaming data is a target file selected by the anchor.

In S82, according to the time stamp information of the first live streaming data and the time stamp information of the second live streaming data, the first live streaming data and the second live streaming data are aligned, and the aligned first live streaming data and second live streaming data are played.

In the process of downloading the first live streaming data and the second live streaming data, the first live streaming data and the second live streaming data are aligned in accordance with the time stamp information of the two. In some embodiments, aligning the first live streaming data and the second live streaming according to the time stamp information of the first live streaming data and the time stamp information of the second live streaming data includes the following S821 to S825.

In S821, a time difference between the time stamp information respectively carried by the first live streaming data and the second live streaming data which are currently downloaded is acquired.

In some embodiments, a time interval is set to obtain the difference between the time stamp information of the two live streaming data. When the time corresponding to the time interval is reached, the time difference between the time stamp information of the first live streaming data and the time stamp information of the second live streaming data is acquired.

In S822, in the case that the time difference is not greater than a predetermined threshold, it is determined that the first live streaming data and the second live streaming data have been aligned.

In the case that the time difference is not greater than the predetermined threshold, the download progress of the two live streaming data is nearly the same. Thus, it is determined that the two live streaming data have been aligned.

In S823, in the case that the time difference is greater than the predetermined threshold, live streaming data carrying the latest time stamp information is determined as the first or second live streaming data In S824, in the case that the first time stamp information is later than the second time stamp information, the first time stamp information is taken as first time stamp information to be aligned, and continuous download of the second live streaming data is waited until the time difference between the time stamp information carried by the second live streaming data which is downloaded in real time and the first time stamp information to be aligned is not greater than the predetermined threshold.

In S825, in the case that the second time stamp information is later than first time stamp information, the second time stamp information is taken as second time stamp information to be aligned, and continuous download of the first live streaming data is waited until time difference between the time stamp information carried by the first live streaming data which is downloaded in real time and the second time stamp information to be aligned is not greater than the predetermined threshold.

For the scenario where the time difference is greater than the predetermined threshold, the live streaming data that is downloaded relatively fast needs to wait for the live streaming data that is downloaded slowly to achieve alignment. In some embodiments, which live streaming data has a relatively fast download progress is determined by determining that the live streaming data with the latest time stamp information is the first live streaming data or the second live streaming data.

In the case that the first time stamp information is later than the second time stamp information, the download progress of the first live streaming data is relatively fast. The first time stamp information is used as the first time stamp information to be aligned, and continuous download of the second live streaming data is waited until the time difference between the time stamp information carried by the second live streaming data which is downloaded in real time and the first time stamp information to be aligned is not greater than the predetermined threshold so as to complete alignment of the first live streaming data and the second live streaming data.

In the case that the second time stamp information is later than the first time stamp information, the download progress of the second live streaming data is relatively fast. The second time stamp information is used as the second time stamp information to be aligned, and continuous download of the first live streaming data is waited until the time difference between the time stamp information carried by the first live streaming data which is downloaded in real time and the second time stamp information to be aligned is not greater than the predetermined threshold so as to complete the alignment of the first live streaming data and the second live streaming data.

The first time stamp information is the time stamp information of the first live streaming data which is currently downloaded, and the second time stamp information is the time stamp information of the second live data which is currently downloaded.

It should be noted that the predetermined threshold is set according to actual requirements, for example, it is set to 100 ms, which is not limited in the embodiments of the present disclosure.

In some embodiments, in the above process of aligning the two live streaming data, in the case that the download progress of the first live data is relatively fast, and a duration in which continuous download of the second live streaming data is waited is greater than a predetermined duration, there is no need to continue to wait for the second live streaming data, and the first live streaming data is played from the time point indicated by the time stamp information to be aligned.

In the case that the download progress of the second live data is relatively fast, and a duration in which continuous download of the first live streaming data is waited is longer than the predetermined duration, there is no need to continue to wait for the first live streaming data, and the second live streaming data is played from the time point indicated by the second time stamp information to be aligned.

After the alignment of the first live streaming data and the second live streaming data is completed, in some embodiments, the aligned first live streaming data and second live streaming data are played in the following way: the first live streaming data is displayed on the live streaming page with the first resolution, and the second live streaming data is displayed on the live streaming page with the second resolution.

In some embodiments, audiences switch the sizes or adjust the positions of an anchor image and a file image according to their own preferences. For example, a suspended window is moved and displayed according to a drag trajectory to realize position adjustment, wherein the drag trajectory is generated based on dragging a small window displaying the anchor image. For example, in response to a switch operation on the first live streaming data and the second live streaming data, the first live streaming data is displayed on the live streaming page with the second resolution, and the second live streaming data is displayed on the live streaming page with the first resolution to realize size switching between the anchor image and the file image.

Figure 9:
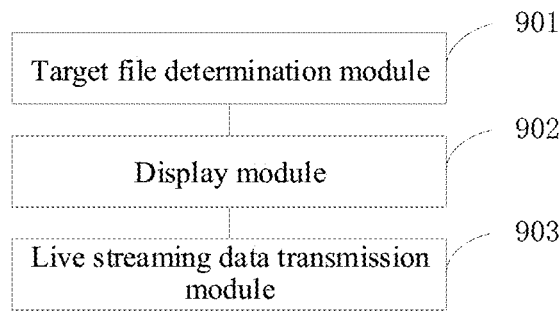
FIG. 9 is a block diagram of an apparatus for processing data in accordance with an embodiment of the present disclosure.

FIG. 9 is a block diagram of an apparatus for processing data in accordance with an embodiment of the present disclosure. Referring to FIG. 9, the apparatus is applicable to a first mobile terminal, and includes a target file determining module 901, a displaying module 902 and a live streaming data transmitting module 903.

The target file determining module 901 is configured to: display a live streaming page, wherein the live streaming page includes a file sharing interface for guiding an anchor to select a file for sharing during live streaming; display a file list in the case that the file sharing interface is triggered; and acquire a target file selected from the file list.

The displaying module 902 is configured to display first live streaming data and the second live streaming data on the live streaming page.

The live streaming data transmitting module 903 is configured to synchronize the first live streaming data and the second live streaming data to a second mobile terminal. The first live streaming data is acquired by a camera of the first mobile terminal, and the second mobile terminal is an audience terminal.

The live streaming data transmitting module 903 is further configured to generate second live streaming data based on the target file.

In some embodiments, the first live streaming data includes at least one of first image data collected by the camera of the first mobile terminal and first audio data collected by a microphone of the first mobile terminal.

The second live streaming data includes at least one of second image data and second audio data.

The target file includes a multimedia or non-multimedia file. The multimedia data includes at least one of image data, audio data and video data.

The live streaming data transmitting module 903 is configured to:

in the case that the target file is pure image data, take the pure image data as the second image data;

in the case that the target file is pure audio data, take the pure audio data as the second audio data;

in the case that the target file is the video data, decode the video data to obtain the second image data and the second audio data; and in the case that the target file is the non-multimedia file, perform a screen shot on the non-multimedia file to obtain the second image data.

In some embodiments, the displaying module 902 is configured to:

display the first live streaming data on the live streaming page with a first resolution, and display the second live streaming data on the live streaming page with a second resolution.

The first resolution is the resolution of a suspended window on the live streaming page, the second resolution is a full-screen resolution required by the current live streaming, and the size of the suspended window is smaller than a full-screen size.

In some embodiments, the live streaming data transmitting module 903 includes:

a first displaying sub-module, configured to display the first live streaming data in a first view control with the first resolution; and a second displaying sub-module, configured to display the second live streaming data in a second view control with the second resolution.

In some embodiments, the displaying module 902 is configured to display the suspended window according to a drag trajectory, wherein the drag trajectory is generated based on dragging the suspended window.

In some embodiments, the live streaming data transmitting module 903 is configured to:

add time stamp information of the same time point to the first live streaming data and the second live streaming data respectively;

wherein the time stamp information is intended to align the first live streaming data and the second live streaming data before playing the first live streaming data and the second live streaming data; and send the first live streaming data carrying the time stamp information and the second live streaming data carrying the time stamp information to a server.

In some embodiments, the live streaming data transmitting module 903 is configured to: add time stamp information indicating a current time point to the first live streaming data at the current time point, and add the time stamp information indicating the current time point to the second live streaming data at the current time point for every fixed time period.

In some embodiments, the live streaming data transmitting module 903 is configured to:

in the case that the target file is a non-video file, send the first live streaming data and the second live streaming data according to a first frame rate; and in the case that the target file is a video file, send the first live streaming data and the second live streaming data according to a second frame rate which is a frame rate of the decoded video file.

Figure 10:
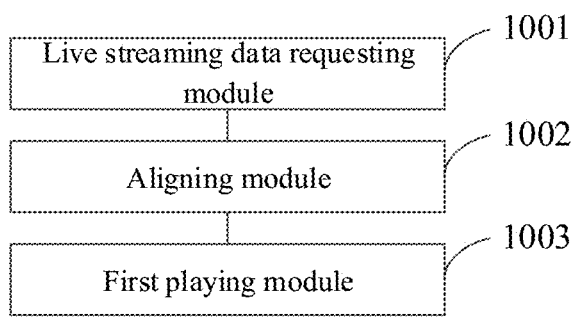
FIG. 10 is a block diagram of another apparatus for processing data in accordance with an embodiment of the present disclosure.

FIG. 10 is a block diagram of another apparatus for processing data in accordance with one embodiment of the present disclosure. Referring to FIG. 10, the apparatus is applicable to a second mobile terminal. The apparatus includes a live streaming data requesting module 1001, an aligning module 1002, and a first playing module 1003.

The live streaming data requesting module 1001 is configured to acquire first live streaming data and second live streaming data of a current live streaming room. The first live streaming data and the second live streaming data carry time stamp information respectively. The second live streaming data is generated according to a target file selected by an anchor. The target file is from a file list displayed after a file sharing interface displayed by a first mobile terminal is triggered. The file sharing interface is for guiding the anchor to select a file for sharing during live streaming.

The aligning module 1002 is configured to align the first live streaming data and the second live streaming data according to the time stamp information respectively carried by the first live streaming data and the second live streaming data.

The first playing module 1003 is configured to play the aligned first live streaming data and second live streaming data.

In some embodiments, the aligning module 1002 includes:

a time difference calculating sub-module, configured to acquire time difference between the time stamp information respectively carried by the first live streaming data and the second live streaming data which are currently downloaded;

a first determining sub-module, configured to determine that the first live streaming data and the second live streaming data have been aligned in the case that the time difference is not greater than a predetermined threshold; and a second determining sub-module, configured to determine that live streaming data carrying the latest time stamp information as the first or second live streaming data in the case that the time difference is greater than the predetermined threshold.

The second determining sub-module is further configured to, in the case that first time stamp information is later than second time stamp information, take the first time stamp information as first time stamp information to be aligned, and continue to download the second live streaming data until time difference between the time stamp information carried by the second live streaming data which is downloaded in real time and the first time stamp information to be aligned is not greater than the predetermined threshold.

The second determining sub-module is further configured to, in the case that second time stamp information is later than first time stamp information, take the second time stamp information as second time stamp information to be aligned, and continue to download the first live streaming data until time difference between the time stamp information carried by the first live streaming data which is downloaded in real time and the second time stamp information to be aligned is not greater than the predetermined threshold.

The first time stamp information is time stamp information of the first live streaming data which is downloaded in real time, and the second time stamp information is time stamp information of the second live streaming data which is downloaded in real time.

In some embodiments, the apparatus further includes:

a second playing module, configured to play the first live streaming data from a time point indicated by the first time stamp information to be aligned in the case that a time period for continuing to download the second live streaming data is greater than a predetermined time period, and play the second live streaming data from a time point indicated by the second time stamp information to be aligned in the case that a time period for continuing to download the first live streaming data is greater than the predetermined time period.

In some embodiments, the first playing module 1003 is configured to: display the first live streaming data on a live streaming page with a predetermined first resolution, and display the second live streaming data on the live streaming page with a predetermined second resolution.

The first resolution is the resolution of a suspended window on the live streaming page, the second resolution is a full-screen resolution required by the current live streaming, and the size of the suspended window is smaller than a full-screen size.

In some embodiments, the apparatus is further configured to:

display the suspended window based on a drag trajectory, wherein the drag trajectory is generated based on dragging the suspended window; and in response to a switch operation of the first live streaming data and the second live streaming data, display the first live streaming data on the live streaming page with the second resolution, and display the second live streaming data on the live streaming page with the first resolution.

Figure 11:
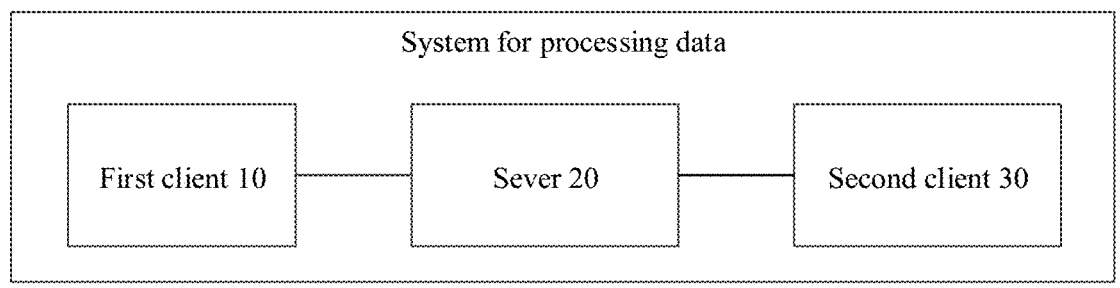
FIG. 11 is a block diagram of a system for processing data in accordance with an embodiment of the present disclosure.

FIG. 11 is a block diagram of a system for processing data in accordance with an embodiment of the present disclosure. Referring to FIG. 11, the system includes a first client 10, a server 20, and a second client 30.

The first client 10 is configured to:
determine a target file to be played in a live streaming;
collect first live streaming data;
display the first live streaming data with a predetermined first resolution and the target file with a predetermined second resolution on a live streaming page;
generate second live streaming data based on the displayed target file;
add time stamp information of the same time point to the first live streaming data and the second live streaming data respectively, wherein the time stamp information is intended to align the first live streaming data and the second live streaming data before playing the first live streaming data and the second live streaming data; and
send the first live streaming data carrying the time stamp information and the second live streaming data carrying the time stamp information to a server.

The server 20 is configured to store the first live streaming data and the second live streaming data, to acquire store addresses of the first live streaming data and the second live streaming data, to generate a download link according to the store addresses and an IP address of the server, and to send the download address to the second client.

The second client 30 is configured to initiate a request to download first live streaming data and second live streaming data of a current live streaming room from the server according to the download link, the first live streaming data and the second live streaming data carrying time stamp information respectively, to align the first live streaming data and the second live streaming data according to the time stamp information respectively carried by the first live streaming data and the second live streaming data, and to play the aligned first live streaming data and second live streaming data.

With regard to the apparatus and the system in the above embodiments, the specific manner in which the respective modules perform the operations has been described in detail in embodiments of the method, which is not explained in detail herein.

Figure 12:
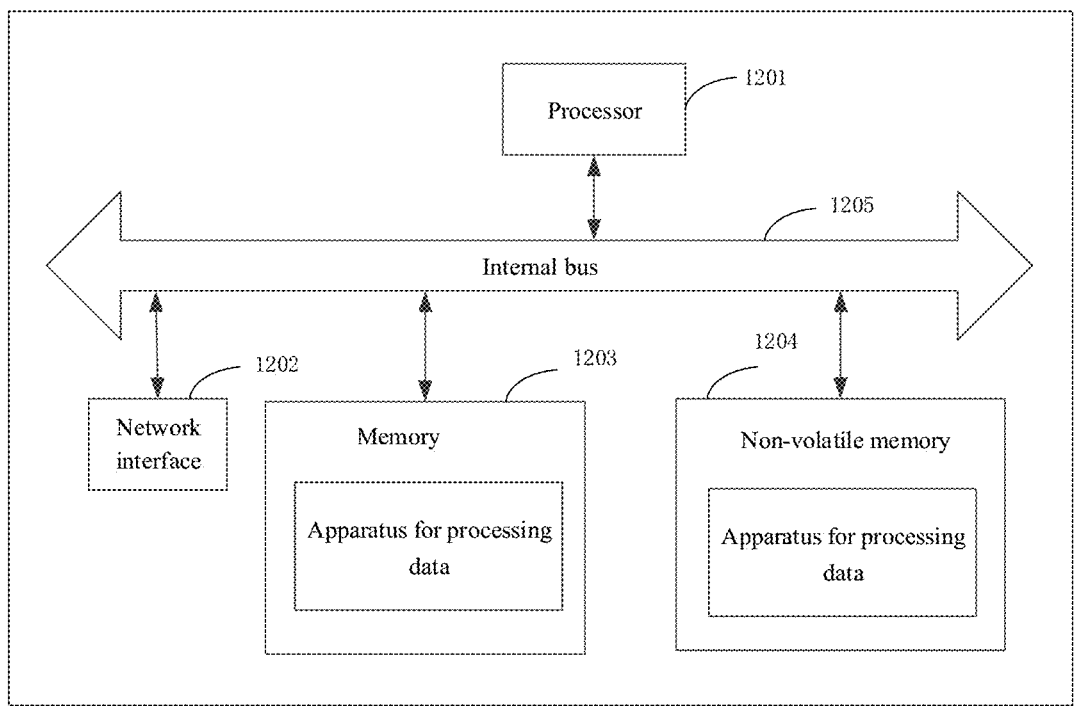
FIG. 12 is a block diagram of a mobile terminal for performing the above-mentioned method embodiment in accordance with an embodiment of the present disclosure.

FIG. 12 is a block diagram of a mobile terminal for performing the above methods in accordance with an embodiment of the present disclosure. The mobile terminal may refer to the first terminal or the second mobile terminal as described above.

As shown in FIG. 12, the terminal includes a processor 1201, a network interface 1202, a memory 1203, a non-volatile memory 1204, and an internal bus 1205. The network interface 1202, the memory 1203, and the non-volatile memory 1204 communicate with each other via the internal bus 1205. In some embodiments, the apparatus is present in the non-volatile memory 1204 or the memory 1203.

An embodiment of the present disclosure provides a storage medium storing at least one instruction therein, such as the above non-volatile memory including at least one instruction. The at least one instruction, when executed by a processor of a mobile terminal, enables the mobile terminal to perform the steps of:

displaying a live streaming page including a file sharing interface for guiding the anchor to select a file for sharing during live streaming;
displaying a file list in the case that the file sharing interface is triggered;
acquiring a target file selected from the file list;
generating second live streaming data based on the target file, and displaying first live streaming data and the second live streaming data on the live streaming page; and
synchronizing the first live streaming data and the second live streaming data to a second mobile terminal, wherein the first live streaming data is acquired by a camera of the first mobile terminal, and the second mobile terminal is an audience terminal.

In some embodiments, the first live streaming data includes at least one of first image data acquired by the camera of the first mobile terminal and first audio data acquired by a microphone of the first mobile terminal;
the second live streaming data includes at least one of second image data and second audio data;
the target file includes a multimedia or non-multimedia file, the multimedia file including at least one of image data, audio data and video data;
the at least one instruction, when executed by a processor of a mobile terminal, enables the mobile terminal to perform the steps of:
in the case that the target file is pure image data, taking the pure image data as the second image data;
in the case that the target file is pure audio data, taking the pure audio data as the second audio data;
in the case that the target file is the video data, decoding the video data to obtain the second image data and the second audio data; and
in the case that the target file is the non-multimedia file, performing a screen shot on the non-multimedia file to obtain the second image data.

In some embodiments, the at least one instruction, when executed by a processor of a mobile terminal, enables the mobile terminal to perform the steps of:
displaying the first live streaming data on the live streaming page with a first resolution; and
displaying the second live streaming data on the live streaming page with a second resolution;
wherein the first resolution is the resolution of a suspended window on the live streaming page, the second resolution is a full-screen resolution required by the current live streaming, and the size of the suspended window is smaller than a full-screen size.

In some embodiments, the at least one instruction, when executed by a processor of a mobile terminal, enables the mobile terminal to perform the steps of:
displaying the first live streaming data in a first view control with the first resolution, and
displaying the second live streaming data in a second view control with the second resolution.

In some embodiments, the at least one instruction, when executed by a processor of a mobile terminal, enables the mobile terminal to perform the step of:
displaying the suspended window according to a drag trajectory, wherein the drag trajectory is generated based on dragging the suspended window.

In some embodiments, the at least one instruction, when executed by a processor of a mobile terminal, enables the mobile terminal to perform the steps of:
adding time stamp information of the same time point to the first live streaming data and the second live streaming data respectively;

wherein the time stamp information is intended to align the first live streaming data and the second live streaming data before playing the first live streaming data and the second live streaming data; and sending the first live streaming data carrying the time stamp information and the second live streaming data carrying the time stamp information to a server.

In some embodiments, the at least one instruction, when executed by a processor of a mobile terminal, enables the mobile terminal to perform the steps of:

adding time stamp information indicating a current time point to the first live streaming data at the current time point; and adding the time stamp information indicating the current time point to the second live streaming data at the current time point for every fixed time period.

In some embodiments, the at least one instruction, when executed by a processor of a mobile terminal, enables the mobile terminal to perform the steps of:

in the case that the target file is a non-video file, sending the first live streaming data and the second live streaming data according to a first frame rate; and in the case that the target file is a video file, sending the first live streaming data and the second live streaming data according to a second frame rate which is a frame rate of the decoded video file.

In some embodiments, the storage medium is a non-transitory computer-readable storage medium, such as a ROM, a RAM, a CD-ROM, a magnetic tape, a floppy disc, an optical data storage device, or the like.

An embodiment of the present disclosure provides a mobile terminal. The mobile terminal includes: a processor; and a memory for storing at least one instruction executable by the processor, wherein the processor is configured to execute the at least one instruction to perform the steps of:

displaying a live streaming page, the live streaming page including a file sharing interface for guiding the anchor to select a file for sharing during live streaming;

displaying a file list in the case that the file sharing interface is triggered;

acquiring a target file selected from the file list;

generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal.

In some embodiments, the first live streaming data includes at least one of first image data acquired by the camera of the first mobile terminal and first audio data acquired by a microphone of the first mobile terminal;

the second live streaming data includes at least one of second image data and second audio data;

the target file includes a multimedia or non-multimedia file, the multimedia file including at least one of image data, audio data, and video data;

the processor is configured to execute at least one instruction to perform the steps of:

in the case that the target file is pure image data, taking the pure image data as the second image data;

in the case that the target file is pure audio data, taking the pure audio data as the second audio data;

in the case that the target file is video data, decoding the video data to obtain the second image data and the second audio data; and in the case that the target file is non-multimedia file, performing a screen shot on the non-multimedia file to obtain the second image data.

In some embodiments, the processor is configured to execute at least one instruction to perform the steps of:

displaying the first live streaming data on the live streaming page with a first resolution; and displaying the second live streaming data on the live streaming page with a second resolution;

wherein the first resolution is the resolution of a suspended window on the live streaming page, the second resolution is a full-screen resolution required by the current live streaming, and the size of the suspended window is smaller than a full-screen size.

In some embodiments, the processor is configured to execute the at least one instruction to perform the steps of:

displaying the first live streaming data in a first view control with the first resolution; and displaying the second live streaming data in a second view control with the second resolution.

In some embodiments, the processor is configured to execute at least one instruction to perform the step of:

displaying the suspended window according to a drag trajectory, wherein the drag trajectory is generated based on dragging the suspended window.

In some embodiments, the processor is configured to execute at least one instruction to perform the steps of:

adding time stamp information of the same time point to the first live streaming data and the second live streaming data respectively;

wherein the time stamp information is intended to align the first live streaming data and the second live streaming data before playing the first live streaming data and the second live streaming data; and sending the first live streaming data carrying the time stamp information and the second live streaming data carrying the time stamp information to a server.

In some embodiments, the processor is configured to execute at least one instruction to perform the steps of:

adding time stamp information indicating a current time point to the first live streaming data at the current time point; and adding the time stamp information indicating the current time point to the second live streaming data at the current time point for every fixed time period.

In some embodiments, the processor is configured to execute at least one instruction to perform the steps of:

in the case that the target file is a non-video file, sending the first live streaming data and the second live streaming data according to a first frame rate; and in the case that the target file is a video file, sending the first live streaming data and the second live streaming data according to a second frame rate which is a frame rate of the decoded video file.

An embodiment of the present disclosure provides a storage medium storing at least one instruction therein. The at least one instruction, when executed by a processor of a mobile terminal, enables the mobile terminal to perform the steps of:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming;

aligning the first live streaming data and the second live streaming data according to the time stamp information respectively carried by the first live streaming data and the second live streaming data, and playing the aligned first live streaming data and second live streaming data.

In some embodiments, the at least one instruction, when executed by a processor of a mobile terminal, enables the mobile terminal to perform the steps of:

acquiring time difference between the time stamp information respectively carried by the first live streaming data and the second live streaming data which are currently downloaded;

in the case that the time difference is not greater than a predetermined threshold, determining that the first live streaming data and the second live streaming data have been aligned;

in the case that the time difference is greater than the predetermined threshold, determining that live streaming data carrying the latest time stamp information as the first or second live streaming data;

in the case that first time stamp information is later than second time stamp information, taking the first time stamp information as first time stamp information to be aligned, and continuing to download the second live streaming data until time difference between the time stamp information carried by the second live streaming data which is downloaded in real time and the first time stamp information to be aligned is not greater than the predetermined threshold; and in the case that in the case that second time stamp information is later than first time stamp information, taking the second time stamp information as second time stamp information to be aligned, and continuing to download the first live streaming data until time difference between the time stamp information carried by the first live streaming data which is downloaded in real time and the second time stamp information to be aligned is not greater than the predetermined threshold;

wherein the first time stamp information is time stamp information of the first live streaming data which is downloaded in real time, and the second time stamp information is time stamp information of the second live streaming data which is downloaded in real time.

In some embodiments, the at least one instruction, when executed by a processor of a mobile terminal, enables the mobile terminal to perform the steps of:

in the case that a time period for continuing to download the second live streaming data is greater than a predetermined time period, playing the first live streaming data from a time point indicated by the first time stamp information to be aligned;

in the case that a time period for continuing to download the first live streaming data is greater than the predetermined time period, playing the second live streaming data from a time point indicated by the second time stamp information to be aligned.

In some embodiments, the at least one instruction, when executed by a processor of a mobile terminal, enables the mobile terminal to perform the steps of:

displaying the first live streaming data on a live streaming page with a first resolution; and displaying the second live streaming data on the live streaming page with a second resolution;

wherein the first resolution is the resolution of a suspended window on the live streaming page, the second resolution is a full-screen resolution required by the current live streaming, and the size of the suspended window is smaller than a full-screen size.

In some embodiments, the at least one instruction, when executed by a processor of a mobile terminal, enables the mobile terminal to perform the steps of:

displaying the suspended window according to a drag trajectory, wherein the drag trajectory is generated based on dragging the suspended window; and in response to a switch operation of the first live streaming data and the second live streaming data, displaying the first live streaming data on the live streaming page with the second resolution, and displaying the second live streaming data on the live streaming page with the first resolution.

An embodiment of the present disclosure provides a mobile terminal. The mobile terminal includes: a processor; and a memory for storing at last one instruction executable by the processor, wherein the processor is configured to execute the at least one instruction to perform the steps of:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming;

aligning the first live streaming data and the second live streaming data according to the time stamp information respectively carried by the first live streaming data and the second live streaming data, and playing the aligned first live streaming data and second live streaming data.

In some embodiments, the processor is configured to execute the at least one instruction to perform the steps of:

acquiring time difference between the time stamp information respectively carried by the first live streaming data and the second live streaming data which are currently downloaded;

in the case that the time difference is not greater than a predetermined threshold, determining that the first live streaming data and the second live streaming data have been aligned;

in the case that the time difference is greater than the predetermined threshold, determining that live streaming data carrying the latest time stamp information as the first or second live streaming data;

in the case that first time stamp information is later than second time stamp information, taking the first time stamp information as first time stamp information to be aligned, and continuing to download the second live streaming data until time difference between the time stamp information carried by the second live streaming data which is downloaded in real time and the first time stamp information to be aligned is not greater than the predetermined threshold; and in the case that second time stamp information is later than first time stamp information, taking the second time stamp information as second time stamp information to be aligned, and continuing to download the first live streaming data until time difference between the time stamp information carried by the first live streaming data which is downloaded in real time and the second time stamp information to be aligned is not greater than the predetermined threshold, wherein the first time stamp information is time stamp information of the first live streaming data which is downloaded in real time, and the second time stamp information is time stamp information of the second live streaming data which is downloaded in real time.

In some embodiments, the processor is configured to execute the at least one instruction to perform the steps of:

in the case that a time period for continuing to download the second live streaming data is greater than a predetermined time period, playing the first live streaming data from a time point indicated by the first time stamp information to be aligned;

in the case that a time period for continuing to download the first live streaming data is greater than the predetermined time period, playing the second live streaming data from a time point indicated by the second time stamp information to be aligned.

In some embodiments, the processor is configured to execute the at least one instruction to perform the steps of:

displaying the first live streaming data on a live streaming page using a first resolution; and displaying the second live streaming data on the live streaming page using a second resolution;

wherein the first resolution is the resolution of a suspended window on the live streaming page, the second resolution is a full-screen resolution required by the current live streaming, and the size of the suspended window is smaller than a full-screen size.

In some embodiments, the processor is configured to execute the at least one instruction to perform the steps of:

displaying the suspended window according to a drag trajectory, wherein the drag trajectory is generated based on dragging the suspended window; and in response to a switch operation of the first live streaming data and the second live streaming data, displaying the first live streaming data on the live streaming page using the second resolution, and displaying the second live streaming data on the live streaming page using the first resolution.

An embodiment of the present disclosure provides a computer program product including at least one executable program code. The at least one executable program code, when run by the mobile terminal, enables the mobile terminal to perform the steps of:

displaying a live streaming page, the live streaming page including a file sharing interface for guiding the anchor to select a file for sharing during live streaming;

displaying a file list in the case that the file sharing interface is triggered;

acquiring a target file selected from the file list;

generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal.

In some embodiments, the first live streaming data includes at least one of first image data acquired by the camera of the first mobile terminal and first audio data acquired by a microphone of the first mobile terminal;

the second live streaming data includes at least one of second image data and second audio data;

the target file includes a multimedia or non-multimedia file, the multimedia file including at least one of image data, audio data and video data;

when the above mobile terminal executes the program codes, the following steps are implemented:

in the case that the target file is pure image data, taking the pure image data as the second image data;

in the case that the target file is pure audio data, taking the pure audio data as the second audio data;

in the case that the target file is video data, decoding the video data to obtain the second image data and the second audio data;

in the case that the target file is non-multimedia file, performing a screen shot on the non-multimedia file to obtain the second image data.

In some embodiments, the at least one executable program code, when run by the mobile terminal, enables the mobile terminal to perform the steps of:

displaying the first live streaming data on the live streaming page with a first resolution; and displaying the second live streaming data on the live streaming page with a second resolution;

wherein the first resolution is the resolution of a suspended window on the live streaming page, the second resolution is a full-screen resolution required by the current live streaming, and the size of the suspended window is smaller than a full-screen size.

In some embodiments, the at least one executable program code, when run by the mobile terminal, enables the mobile terminal to perform the steps of:

displaying the first live streaming data in a first view control using the first resolution; and displaying the second live streaming data in a second view control using the second resolution.

In some embodiments, the at least one executable program code, when run by the mobile terminal, enables the mobile terminal to perform the step of:

displaying the suspended window according to a drag trajectory, wherein the drag trajectory is generated based on dragging the suspended window.

In some embodiments, the at least one executable program code, when run by the mobile terminal, enables the mobile terminal to perform the steps of:

adding time stamp information of the same time point to the first live streaming data and the second live streaming data respectively, wherein the time stamp information is intended to align the first live streaming data and the second live streaming data before playing the first live streaming data and the second live streaming data; and sending the first live streaming data carrying the time stamp information and the second live streaming data carrying the time stamp information to a server.

In some embodiments, the at least one executable program code, when run by the mobile terminal, enables the mobile terminal to perform the steps of:

adding time stamp information indicating a current time point to the first live streaming data at the current time point; and adding the time stamp information indicating the current time point to the second live streaming data at the current time point for every fixed time period.

In some embodiments, the at least one executable program code, when run by the mobile terminal, enables the mobile terminal to perform the steps of:

in the case that the target file is a non-video file, sending the first live streaming data and the second live streaming data according to a first frame rate; and in the case that the target file is a video file, sending the first live streaming data and the second live streaming data according to a second frame rate which is a frame rate of the decoded video file.

An embodiment of the present disclosure provides a computer program product including at least one executable program code. The at least one executable program code, when run by the mobile terminal, enables the mobile terminal to perform the steps of:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming;

aligning the first live streaming data and the second live streaming data according to the time stamp information respectively carried by the first live streaming data and the second live streaming data, and playing the aligned first live streaming data and second live streaming data.

In some embodiments, the at least one executable program code, when run by the mobile terminal, enables the mobile terminal to perform the steps of:

acquiring time difference between the time stamp information respectively carried by the first live streaming data and the second live streaming data which are currently downloaded;

in the case that the time difference is not greater than a predetermined threshold, determining that the first live streaming data and the second live streaming data have been aligned;

in the case that the time difference is greater than the predetermined threshold, determining that live streaming data carrying the latest time stamp information as the first or second live streaming data;

in the case that first time stamp information is later than second time stamp information, taking the first time stamp information as first time stamp information to be aligned, and continuing to download the second live streaming data until time difference between the time stamp information carried by the second live streaming data which is downloaded in real time and the first time stamp information to be aligned is not greater than the predetermined threshold; and in the case that second time stamp information is later than first time stamp information, taking the second time stamp information as second time stamp information to be aligned, and continuing to download the first live streaming data until time difference between the time stamp information carried by the first live streaming data which is downloaded in real time and the second time stamp information to be aligned is not greater than the predetermined threshold;

wherein the first time stamp information is time stamp information of the first live streaming data which is downloaded in real time, and the second time stamp information is time stamp information of the second live streaming data which is downloaded in real time.

In some embodiments, the at least one executable program code, when run by the mobile terminal, enables the mobile terminal to perform the steps of:

in the case that a time period for continuing to download the second live streaming data is greater than a predetermined time period, playing the first live streaming data from a time point indicated by the first time stamp information to be aligned;

in the case that a time period for continuing to download the first live streaming data is greater than the predetermined time period, playing the second live streaming data from a time point indicated by the second time stamp information to be aligned.

In some embodiments, The at least one executable program code, when run by the mobile terminal, enables the mobile terminal to perform the steps of:

displaying the first live streaming data on a live streaming page with a first resolution; and displaying the second live streaming data on the live streaming page with a second resolution;

wherein the first resolution is the resolution of a suspended window on the live streaming page, the second resolution is a full-screen resolution required by the current live streaming, and the size of the suspended window is smaller than a full-screen size.

In some embodiments, the at least one executable program code, when run by the mobile terminal, enables the mobile terminal to perform the steps of:

displaying the suspended window according to a drag trajectory, wherein the drag trajectory is generated based on dragging the suspended window; and in response to a switch operation of the first live streaming data and the second live streaming data, displaying the first live streaming data on the live streaming page with the second resolution, and displaying the second live streaming data on the live streaming page with the first resolution.

Other embodiments of the present disclosure are apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as examples only, with a true scope and spirit of the present disclosure is indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be defined by the appended claims.

What is claimed is:

1. A method for processing data, applicable to a first mobile terminal of an anchor, the method comprising:

displaying a live streaming page, the live streaming page comprising a file sharing interface for guiding the anchor to select a file for sharing during live streaming;

displaying a file list in the case that the file sharing interface is triggered;

acquiring a target file selected from the file list;

generating second live streaming data based on the target file, and displaying first live streaming data and the second live streaming data on the live streaming page; and synchronizing the first live streaming data and the second live streaming data to a second mobile terminal, wherein the first live streaming data is acquired by a camera of the first mobile terminal, and the second mobile terminal is an audience terminal, wherein the second live streaming data comprises at least one of second image data or second audio data, wherein the target file comprises a multimedia or non-multimedia file, the multimedia file comprising at least one of image data, audio data or video data, wherein said generating the second live streaming data based on the target file comprises:

taking pure image data as the second image data in the case that the target file is the pure image data;

taking pure audio data as the second audio data in the case that the target file is the pure audio data;

decoding video data to obtain the second image data and the second audio data in the case that the target file is the video data; and performing a screen shot on non-multimedia file to obtain the second image data in the case that the target file is the non-multimedia file, wherein said displaying the first live streaming data and the second live streaming data on the live streaming page comprises:

displaying the first live streaming data on the live streaming page with a first resolution; and displaying the second live streaming data on the live streaming page with a second resolution;

wherein the first resolution is the resolution of a suspended window on the live streaming page, the second resolution is a full-screen resolution required by the current live streaming, and the size of the suspended window is smaller than a full-screen size, and wherein said synchronizing the first live streaming data and the second live streaming data to the second mobile terminal comprises:

adding time stamp information of the same time point to the first live streaming data and the second live streaming data respectively;

wherein the time stamp information is intended to align the first live streaming data and the second live streaming data before playing the first live streaming data and the second live streaming data; and sending the first live streaming data carrying the time stamp information and the second live streaming data carrying the time stamp information to a server.

2. The method according to claim 1, wherein the first live streaming data comprises at least one of first image data acquired by the camera of the first mobile terminal or first audio data acquired by a microphone of the first mobile terminal.

3. The method according to claim 1, wherein said displaying the first live streaming data on the live streaming page using the first resolution, and displaying the second live streaming data on the live streaming page using the second resolution comprises:

displaying the first live streaming data in a first view control with the first resolution; and displaying the second live streaming data in a second view control with the second resolution.

4. The method according to claim 1, further comprising:

displaying the suspended window according to a drag trajectory, wherein the drag trajectory is generated based on dragging the suspended window.

5. The method according to claim 1, wherein said adding the time stamp information of the same time point to the first live streaming data and the second live streaming data respectively comprises:

adding time stamp information indicating a current time point to the first live streaming data at the current time point; and adding the time stamp information indicating the current time point to the second live streaming data at the current time point for every fixed time period.

6. The method according to claim 1, wherein said sending the first live streaming data carrying the time stamp information and the second live streaming data carrying the time stamp information to the server comprises:

sending the first live streaming data and the second live streaming data according to a first frame rate in the case that the target file is a non-video file; and sending the first live streaming data and the second live streaming data according to a second frame rate which is a frame rate of the decoded video file in the case that the target file is a video file.

7. A method for processing data, applicable to a second mobile terminal of an audience, the method comprising:

acquiring first live streaming data and second live streaming data of a current live streaming room, wherein the first live streaming data and the second live streaming data carry time stamp information respectively; the second live streaming data is generated according to a target file selected by an anchor; the target file is from a file list displayed after a file sharing interface displayed by a first mobile terminal is triggered; and the file sharing interface is for guiding the anchor to select a file for sharing during live streaming; and aligning the first live streaming data and the second live streaming data according to the time stamp information respectively carried by the first live streaming data and the second live streaming data, and playing the aligned first live streaming data and second live streaming data, wherein said aligning the first live streaming data and the second live streaming data according to the time stamp information respectively carried by the first live streaming data and the second live streaming data comprises:

acquiring time difference between the time stamp information respectively carried by the first live streaming data and the second live streaming data which are currently downloaded;

determining that the first live streaming data and the second live streaming data have been aligned in the case that the time difference is not greater than a predetermined threshold;

determining that live streaming data carrying the latest time stamp information as the first or second live streaming data in the case that the time difference is greater than the predetermined threshold;

taking the first time stamp information as first time stamp information to be aligned, and continuing to download the second live streaming data until time difference between the time stamp information carried by the second live streaming data which is downloaded in real time and the first time stamp information to be aligned is not greater than the predetermined threshold in the case that first time stamp information is later than second time stamp information; and taking the second time stamp information as second time stamp information to be aligned, and continuing to download the first live streaming data until time difference between the time stamp information carried by the first live streaming data which is downloaded in real time and the second time stamp information to be aligned is not greater than the predetermined threshold in the case that second time stamp information is later than first time stamp information, and wherein the first time stamp information is time stamp information of the first live streaming data which is downloaded in real time, and the second time stamp information is time stamp information of the second live streaming data which is downloaded in real time.

8. The method according to claim 7, further comprising:
playing the first live streaming data from a time point indicated by the first time stamp information to be aligned in the case that a time period for continuing to download the second live streaming data is greater than a predetermined time period;
playing the second live streaming data from a time point indicated by the second time stamp information to be aligned in the case that a time period for continuing to download the first live streaming data is greater than the predetermined time period.

9. The method according to claim 7, wherein said playing the aligned first live streaming data and second live streaming data comprises:
displaying the first live streaming data on a live streaming page with a first resolution; and
displaying the second live streaming data on the live streaming page with a second resolution;
wherein the first resolution is the resolution of a suspended window on the live streaming page, the second resolution is a full-screen resolution required by the current live streaming, and the size of the suspended window is smaller than a full-screen size.

10. The method according to claim 9, further comprising:
displaying the suspended window according to a drag trajectory, wherein the drag trajectory is generated based on dragging the suspended window; and
in response to a switch operation of the first live streaming data and the second live streaming data, displaying the first live streaming data on the live streaming page with the second resolution, and displaying the second live streaming data on the live streaming page with the first resolution.

11. A mobile terminal comprising:
a processor; and
a memory for storing at least one instruction executable by the processor,
wherein the at least one instruction, when executed by the processor, causes the processor to perform a method comprising:
displaying a live streaming page, the live streaming page comprising a file sharing interface for guiding an anchor to select a file for sharing during live streaming;
displaying a file list in the case that the file sharing interface is triggered;
acquiring a target file selected from the file list;
generating second live streaming data based on the target file, and displaying first live streaming data and the second live streaming data on the live streaming page; and
synchronizing the first live streaming data and the second live streaming data to a second mobile terminal, wherein the first live streaming data is acquired by a camera of the mobile terminal, and the second mobile terminal is an audience terminal,
wherein the second live streaming data comprises at least one of second image data or second audio data,
wherein the target file comprises a multimedia or non-multimedia file, the multimedia file comprising at least one of image data, audio data or video data,
wherein said generating the second live streaming data based on the target file comprises:
taking pure image data as the second image data in the case that the target file is the pure image data;
taking pure audio data as the second audio data in the case that the target file is the pure audio data;
decoding video data to obtain the second image data and the second audio data in the case that the target file is the video data; and
performing a screen shot on non-multimedia file to obtain the second image data in the case that the target file is the non-multimedia file,
wherein said displaying the first live streaming data and the second live streaming data on the live streaming page comprises:
displaying the first live streaming data on the live streaming page with a first resolution; and
displaying the second live streaming data on the live streaming page with a second resolution,
wherein the first resolution is the resolution of a suspended window on the live streaming page, the second resolution is a full-screen resolution required by the current live streaming, and the size of the suspended window is smaller than a full-screen size, and
wherein said synchronizing the first live streaming data and the second live streaming data to the second mobile terminal comprises:
adding time stamp information of the same time point to the first live streaming data and the second live streaming data respectively;
wherein the time stamp information is intended to align the first live streaming data and the second live streaming data before playing the first live streaming data and the second live streaming data; and
sending the first live streaming data carrying the time stamp information and the second live streaming data carrying the time stamp information to a server.

12. The mobile terminal according to claim 11, wherein the first live streaming data comprises at least one of first image data acquired by the camera of the mobile terminal or first audio data acquired by a microphone of the mobile terminal.

13. The mobile terminal according to claim 11, wherein the method further comprises:
displaying the suspended window according to a drag trajectory, wherein the drag trajectory is generated based on dragging the suspended window.

* * * * *